(12) United States Patent
Makki et al.

(10) Patent No.: US 11,929,947 B2
(45) Date of Patent: Mar. 12, 2024

(54) FAIRNESS AND COMPLEXITY CONSTRAINED UPLINK TRANSMISSION USING COORDINATED MULTIPOINT (COMP) NON-ORTHOGONAL MULTIPLE ACCESS (NOMA)

(71) Applicant: Telefonaktiebolaget LM Ericsson (publ), Stockholm (SE)

(72) Inventors: Behrooz Makki, Gothenburg (SE); Ali Behravan, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1018 days.

(21) Appl. No.: 16/322,328

(22) PCT Filed: Dec. 10, 2018

(86) PCT No.: PCT/EP2018/084174
§ 371 (c)(1),
(2) Date: Jan. 31, 2019

(87) PCT Pub. No.: WO2020/119880
PCT Pub. Date: Jun. 18, 2020

(65) Prior Publication Data
US 2021/0376974 A1    Dec. 2, 2021

(51) Int. Cl.
*H04L 5/00* (2006.01)
*H04B 1/10* (2006.01)
*H04L 41/04* (2022.01)
*H04W 52/34* (2009.01)
*H04W 52/54* (2009.01)

(52) U.S. Cl.
CPC ............ *H04L 5/0035* (2013.01); *H04B 1/10* (2013.01); *H04W 52/34* (2013.01); *H04L 41/04* (2013.01)

(58) Field of Classification Search
CPC ...... H04L 5/0035; H04L 41/04; H04W 52/34; H04B 1/10
See application file for complete search history.

(56) References Cited

U.S. PATENT DOCUMENTS

2015/0270918 A1    9/2015  Lee et al.
2015/0312074 A1*  10/2015  Zhu ..................... H04W 52/16
                                                                                 370/329
(Continued)

OTHER PUBLICATIONS

Gesbert et al. Multi-Cell MIMD Cooperative Networks: A New Look at Interference, Dec. 2010, IEEE Journal on Selected Areas in Communications, vol. 28, pp. 1380-1408, No. 9 (Year: 2010).*
(Continued)

*Primary Examiner* — Walter J Divito
*Assistant Examiner* — Anthony Luo
(74) *Attorney, Agent, or Firm* — Rothwell, Figg, Ernst & Manbeck, P.C.

(57) ABSTRACT

A method in a communication network. The method includes a first network node receiving a first combined signal comprising a first message transmitted by a first UE and a second message transmitted by a second UE. The method includes the first network node decoding the first message. The method includes the first network node using a backhaul link to transmit the decoded first message to a second network node that receives a second combined signal comprising the first message and a third message transmitted by a third UE.

19 Claims, 12 Drawing Sheets

(56) References Cited

U.S. PATENT DOCUMENTS

2016/0164952 A1* 6/2016 Tur .................. H04L 67/10
709/219
2016/0205695 A1 7/2016 Kishiyama et al.

OTHER PUBLICATIONS

3GPP TR 36.866, V12.0.1, (Mar. 2014), 3rd Generation Partnership Project; Technical Specification Group Radio Access Network; Study on Network-Assisted Interference Cancellation and Suppression (NAIC) for LTE (Release 12), Mar. 2014, (64 pages).
3GPP TSG RAN Meeting #67, RP-150496; Shanghai, China; Mar. 9-12, 2015; MediaTek Inc., "New SI Proposal: Study on Downlink Multiuser Superposition Transmission for LTE", (7 pages).
3GPP TSG RAN WG1 Meeting #86, R1-166056; Göteborg, Sweden; Aug. 22-26, 2016; MCC Support, "Final Report of 3GPP TSG RAN WG1 #85 v1.0.0", (170 pages).
Xu, Peng et al., "NOMA: An Information Theoretic Perspective", IEEE, arXiv:1504.07751v2 [cs.IT], May 12, 2015, (6 pages).
International Search Report issued in International Application No. PCT/EP2018/084174, dated Aug. 28, 2019 (5 pages).
David Gesbert, et al., "Multi-Cell MIMO Cooperative Networks: A New Look at Interference", IEEE Journal on Selected Areas in Communications, vol. 28, No. 9, Dec. 2010 (29 pages).
Huawei et al., "Discussion on the design of NOMA receiver", 3GPP TSG RAN SG1 Meeting #94bis, R1-1811881, Chengdu, China, Oct. 8-12, 2018 (22 pages).

* cited by examiner

NOMA-based Data Transmission

US 11,929,947 B2

FAIRNESS AND COMPLEXITY CONSTRAINED UPLINK TRANSMISSION USING COORDINATED MULTIPOINT (COMP) NON-ORTHOGONAL MULTIPLE ACCESS (NOMA)

CROSS REFERENCE TO RELATED APPLICATION(S)

This application is a 35 U.S.C. § 371 National Stage of International Patent Application No. PCT/EP2018/084174, filed Dec. 10, 2018, designating the United States.

TECHNICAL FIELD

Disclosed are embodiments related to non-orthogonal multiple access (NOMA) networks.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

Coordinated multi-point (CoMP) is a scheme considered to improve the performance of cell-edge UEs (i.e., UEs with comparatively lower channel qualities). While CoMP-based data transmission may improve the achievable uplink (UL) rate for the cell-edge UEs, the improved achievable rate comes at the cost of wasting spectrum resources for a cell-edge UE with particularly poor channel conditions. Accordingly, there is a need to develop methods which reuse the spectrum allocated to the cell-edge UE to support other UEs (e.g., cell-center UEs (i.e. UEs having relatively good channel qualities)), and simultaneously improve the achievable rate of the cell-edge UEs and the cell-center UEs. Such smart data transmission methods may reduce implementation complexity and simplify the UE grouping (e.g., pairing) procedure compared to non-CoMP based NOMA systems.

In an aspect, there is provided a CoMP-based data transmission method using NOMA. The objective is to improve the achievable rate of the cell-edge UE and the network fairness while reducing implementation complexity, compared to the non-CoMP based NOMA schemes. The embodiments disclosed herein may also improve the performance of the cell-center UEs. Accordingly, the CoMP-based data transmission method using NOMA described herein allows lower end-to-end transmission delay for both the cell-edge and the cell-center UEs based on increased achievable rates and network diversity. All network nodes in the proposed CoMP-NOMA scheme, with the exception of one of the cooperative network nodes, remove interfering signals with no need for decoding, thereby reducing the decoding complexity.

In the proposed setup described herein, different multiple access and data transmission schemes are considered by the UEs depending on the rate demands of the UEs and the channels qualities. The network nodes adapt their decoding and backhauling schemes depending on the selected multiple access and data transmission approach.

In one aspect there is provided a method in a communication network. The method includes a first network node receiving a first combined signal comprising a first message transmitted by a first UE and a second message transmitted by a second UE. The method includes the first network node decoding the first message. The method includes the first network node using a backhaul link to transmit the decoded first message to a second network node that receives a second combined signal comprising the first message and a third message transmitted by a third UE.

In some embodiments, the first network node uses a successive interference cancellation (SIC) based receiver to decode the first message.

In some embodiments, the method includes the first network node obtaining first channel gain information indicating the gain of a first channel between the first network node and the first UE; the first network node obtaining second channel gain information indicating the gain of a second channel between the first network node and the second UE; the first network node obtaining a first rate demand for the first UE; determining a maximum achievable rate for the first UE based on at least the first channel gain information and the second channel gain information; and the first network node determining whether the first rate demand for the first UE is greater than the determined maximum achievable rate for the first UE.

In some embodiments, the method includes the first network node determining a non-orthogonal multiple access (NOMA) scheme based on the determination of whether the first rate demand for the first UE is greater than the determined maximum achievable rate for the first UE.

In some embodiments, the method includes the second network node using the first message received from the first network node to decode the third message from the second combined signal. In some embodiments, using the first message received from the first network node to decode the third message from the second combined signal comprises the second network node removing the first message from the second combined signal. After removing the first message from the second combined signal, thereby obtaining a modified second combined signal, the second network node decodes the third message from the modified second combined signal.

In some embodiments, the method includes the first network node using the decoded first message to decode the second message from the first combined signal; and the first network node using the backhaul link to transmit the decoded second message to the second network node. In some embodiments, the first network node using the decoded first message to decode the second message comprises the first network node removing the first message from the first combined signal. After removing the first message from the first combined signal, thereby obtaining a modified first combined signal, the first network node decodes the second message from the modified first combined signal.

In some embodiments, the second combined signal further comprises the second message and the method includes the second network node using the first and second messages received from the first network node to decode the third message from the second combined signal. In some embodiments, the second network using the first and second messages received from the first network node decodes the third message from the second combined signal comprises the second network node removing the first and second messages from the second combined signal. After removing the first and second messages from the second combined signal, thereby obtaining a modified second combined signal, the second network node decoding the third message from the modified second combined signal.

In another aspect, there is provided a first network node. The first network node is adapted to receive a first combined signal comprising a first message transmitted by a first user equipment, UE, and a second message transmitted by a second UE. The first network node is adapted to decode the first message. The first network node is adapted to use a backhaul link to transmit the decoded first message to a second network node that receives a second combined signal comprising the first message and a third message transmitted by a third UE.

In some embodiments, the first network node is further adapted to use a successive interference cancellation (SIC) based receiver to decode the first message.

In some embodiments, the first network node is further adapted to obtain first channel gain information indicating the gain of a first channel between the first network node and the first UE; obtain second channel gain information indicating the gain of a second channel between the first network node and the second UE; obtain a first rate demand for the first UE; determine a maximum achievable rate for the first UE based on at least the first channel gain information and the second channel gain information; and determine whether the first rate demand for the first UE is greater than the determined maximum achievable rate for the first UE.

In some embodiments, the first network node is further adapted to determine a non-orthogonal multiple access (NOMA) scheme based on the determination of whether the first rate demand for the first UE is greater than the determined maximum achievable rate for the first UE.

In some embodiments, the first network node is further adapted to use the decoded first message to decode the second message from the first combined signal; and use the backhaul link to transmit the decoded second message to the second network node. In some embodiments, the first network node using the decoded first message to decode the second message comprises the first network node removing the first message from the first combined signal. After removing the first message from the first combined signal, thereby obtaining a modified first combined signal, the first network node decodes the second message from the modified first combined signal.

In another aspect, there is provided a first network node. The first network node is adapted to receive a first combined signal comprising a first message transmitted by a first user equipment, UE, and a second message transmitted by a second UE. The first network node is adapted to receive, using a backhaul link, a decoded first message transmitted by a second network node that receives a second combined signal comprising the first message and a third message transmitted by a third UE. The first network node is adapted to use the decoded first message transmitted by the second network node to decode the second message from the first combined signal.

In some embodiments, using the decoded first message transmitted by the second network node to decode the second message from the first combined signal comprises the first network node removing the first message from the first combined signal. After removing the first message from the first combined signal, thereby obtaining a modified first combined signal, the first network node decodes the second message from the modified first combined signal.

The proposed CoMP-NOMA based data transmission setup described herein improves the UEs achievable rates and increases the network diversity, leading to a reduced number of required retransmissions. Moreover, the proposed CoMP-NOMA approach simplifies the UE grouping procedure and reduces the decoding complexity and/or delay. The proposed setup described herein considerably improves the achievable rates for both the cell-center and the cell-edge UE and allows enhanced fairness in the network. Additionally, the proposed setup described herein reduces the end-to-end transmission delay of the network and, as a result, increases the end-to-end throughput.

BRIEF DESCRIPTION OF THE DRAWINGS

The accompanying drawings, which are incorporated herein and form part of the specification, illustrate various embodiments.

DETAILED DESCRIPTION

Figure 1:
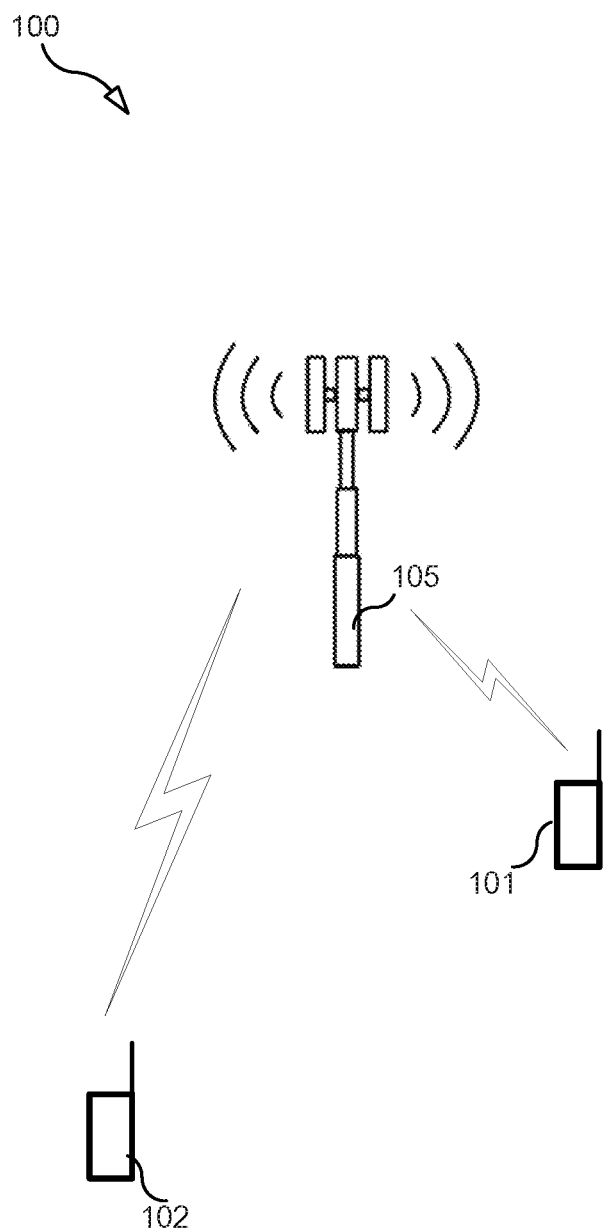
FIG. 1 illustrates a network node communicating simultaneously with a first UE and a second UE.
Figure 4:
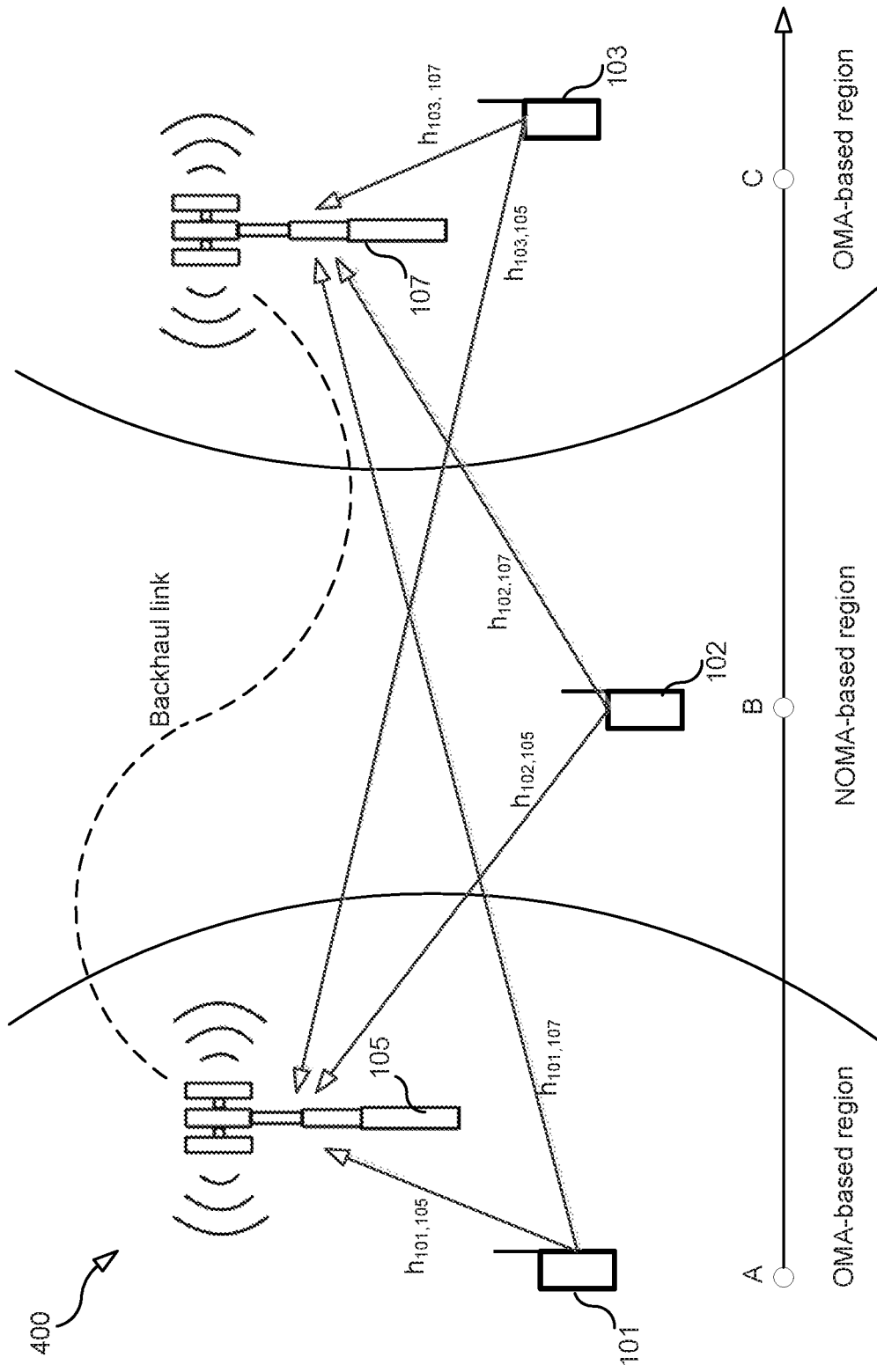
FIG. 4 illustrates a communication network according to one embodiment.

FIG. 1 illustrates a network 100 having a first network node 105 (e.g., access point (AP) such as, for example, a 4G or 5G base station or other access point) serving a large number of UEs—e.g., UE 101, UE 102 etc. While only two UEs are shown, first network node 105 may serve N number of UEs, where N>>3. In some embodiments, there may be a second network node 107 serving the N number of UEs. For example, the first network node 105 and a second network node 107 may each serve UE 101, UE 102, and UE 103, as shown in FIG. 4. The UEs communicate with the first network node 105 and/or second network node 107 using a limited number of spectrum resource blocks, i.e., time-frequency chunks.

Figure 2:
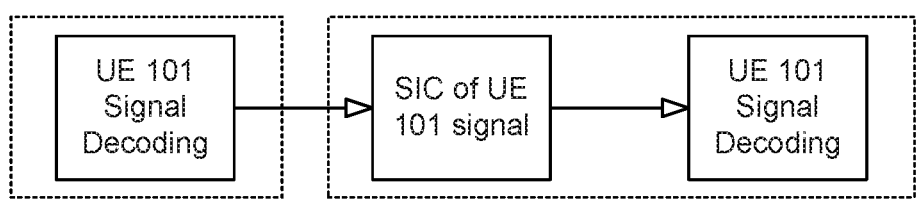
FIG. 2 illustrates processing performed by a network node according to one embodiment.
Figure 2:
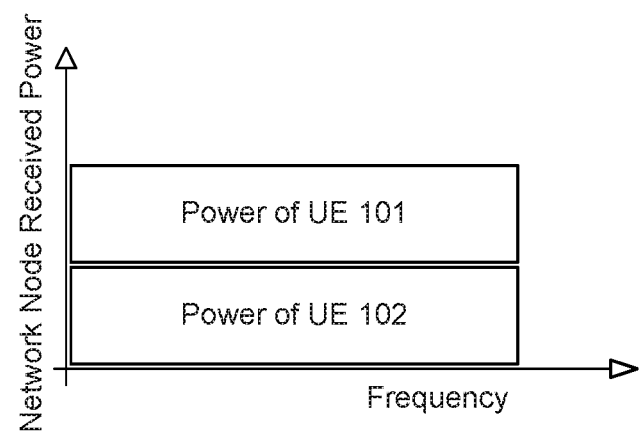
Figure 3:
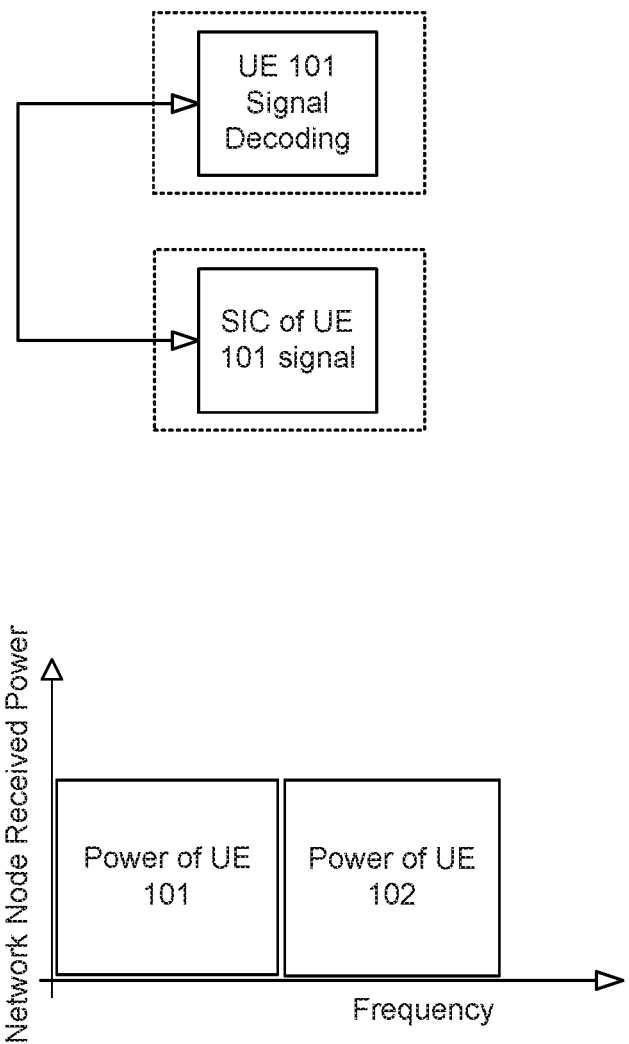
FIG. 3 illustrates processing performed by a network node according to one embodiment.

In FIGS. 1-3, the simplest case of an uplink scenario is considered, in which a cell-edge UE 102 and a cell-center UE 101, i.e. two UEs with different channel qualities, connected to the first network node 105. With NOMA based data transmission, UE 101 and UE 102 share the same spectrum and time resource to send each respective message simultaneously using the same frequency resources as shown in FIG. 2. Upon receiving the messages transmitted by UE 101 and UE 102, the first network node 105 uses a SIC receiver to first decode the message of the cell-center UE 101, considering the signal of the cell-edge UE 102 as noise. After successfully decoding the UE 101 message, the first network node 105 subtracts the signal of UE 101 from the received signal and decodes the UE 102 signal with no interference from UE 101.

Considering the transmission setup of FIGS. 1 and 2, for example, the achievable rates of different UEs in the NOMA scheme are determined as:

$$\begin{cases} R_{101,NOMA} = \log_2\left(1 + \frac{P_{101}g_{101}}{1 + P_{102}g_{102}}\right)\left[\frac{\text{bit}}{\text{symbol}}\right] & \text{(i)} \\ R_{102,NOMA} = \log_2(1 + P_{102}g_{102}) \cdot \left[\frac{\text{bit}}{\text{symbol}}\right] & \text{(ii)} \end{cases} \quad (1)$$

With OMA based data transmission, UE 101 and UE 102 use separate spectrum resources to send each respective message simultaneously using different frequency resources as shown in FIG. 3. Considering the transmission setup of FIGS. 1 and 3, for example, the achievable rates of different UEs in the OMA scheme are determined as:

$$\begin{cases} R_{101,OMA} = \alpha\log_2\left(1 + \frac{P_{101}g_{101}}{\alpha}\right)\left[\frac{\text{bit}}{\text{symbol}}\right] & \text{(i)} \\ R_{102,OMA} = (1-\alpha)\log_2\left(1 + \frac{P_{102}g_{102}}{1-\alpha}\right)\left[\frac{\text{bit}}{\text{symbol}}\right] & \text{(ii)} \end{cases} \quad (2)$$

Here, $P_i$, i=101, 102, represents the transmission power of UE i. Also, $g_i$, i=101, 102, is the channel gain between the i-th UE and the first network node 105 and $\alpha$ denotes the portion of the spectrum allocated to UE 101. The maximum possible transmission power of the i-th UE is indicated as $P_{i,max}$, i=101, 102. The data rate associated with a buffer size of UE 102 is referred to as a rate demand of the UE 102 and indicated as $r_{102}$. Based on a comparison of Equations (1)(ii) and (2)(ii), it is clear that the implementation of NOMA improves the achievable rate of UE 102 compared to OMA based on a given power $P_{102}$ and channel gain $g_{102}$. There may be instances in which NOMA-based data transmission also increases the achievable rate of UE 101 depending on the interference term, i.e. the $P_{102}g_{102}$ in Equation (1)(i).

Given the above background, suppose that UE 102, i.e., the cell-edge UE, has an important message to send and has been in queue for a long time due to, for example, scheduling, and that it is now important to serve UE 102. A spectrum allocated to the UE 102 will be wasted, however, if the connection link between UE 102 and the first network node 105 experiences poor channel conditions. Accordingly, it would be beneficial to share the allocated spectrum with UE 101, i.e., the cell-center UE, provided that: (1) the performance improvement is worth the additional decoding complexity and/or delay; (2) the rate constraint of UE 102, i.e., the cell-edge UE, is satisfied; and (3) compared to the rate achieved by OMA, UE 101, i.e., the cell-center UE, does not lose much (possibly even gains) in terms of the achievable rate.

FIG. 4 illustrates a communication network according to one embodiment of the proposed setup. In the setup shown in FIG. 4, an embodiment with two network nodes, e.g., the first network node 105 and the second network node 107, and three UEs, e.g., UE 101, 102, and 103, is described. This, however, is not required and the proposed setup may be applied to cases with an arbitrary number of network nodes and UEs. Additionally, the proposed setup shown in FIG. 4 is described using FDMA as the reference OMA scheme. This is also not required and the proposed setup can be adapted for different OMA schemes in other embodiments.

As shown in FIG. 4, different multiple access schemes, decoding and backhauling techniques may be considered by the UEs and network nodes depending on the channel conditions and the buffer size of UE 102, i.e. the cell-edge UE. For example, in point A where there is a good quality connection between the first network node 105 and UE 102, i.e., channel $h_{102, 105}$, the UEs, e.g., UE 101 and UE 102, perform data transmissions according to an OMA scheme and the first network node 105 uses OMA based receivers without backhaul communication with the second network node 107. Similarly, in point C where there is a good quality connection between the second network node 107 and UE 102, i.e., channel $h_{102,107}$, the UEs, e.g., UE 102 and UE 103, perform data transmissions according to an OMA scheme and the second network node 107 uses OMA based receivers without backhaul communication with the first network node 105.

In Point B, the UEs perform data transmissions according to a CoMP-based NOMA scheme and the UEs may share a spectrum allocated to UE 102 as long as the minimum rate requirement of UE 102 is supported. In some embodiments, when UE 102 is in Point B, the first network node 105 uses a successive interference cancellation (SIC) based receiver to first decode-and-remove the message of UE 101 and then decode the message of UE 102. In such embodiments, the first network node 105 uses a backhaul link to transmit the decoded message of UE 102 to the second network node 107. The second network node 107 uses the received decoded message of UE 102 to decode the message of UE 103 without any interference. In some embodiments, the first network node 105 transmits the decoded message of UE 101 to the second network node 107. As shown in FIG. 4, different NOMA-based transmission schemes, e.g., different data transmission, backhauling, and message decoding schemes, with partial spectrum sharing may be considered depending on the rate requirements and channel conditions according to some embodiments.

The proposed setup described herein may be further explained through a signaling procedure. In the context of the current disclosure, it is considered that an equal portion of a spectrum is allocated to each of the UEs when using OMA for simplicity of expressions. This, however, is not required and the proposed setup may be applied if portions of the spectrum are not equally allocated to the UEs when using OMA. Considering also that UE 102 has an urgent need to send data with rate $r_2$, the data transmission scheme may be adapted as described in the followings steps according to some embodiments.

Step 1: The UEs, e.g., UE 101, 102, and 103, send pilot signals to the network nodes, e.g., network nodes 105, 107. The UE 102 also sends its buffer size, i.e., its rate demand $r_{102}$ to the network nodes.

Step 2: The network nodes estimate the channel gains and determine the appropriate multiple access scheme based on the channel qualities and the rate demand $r_{102}$.

Figure 5:
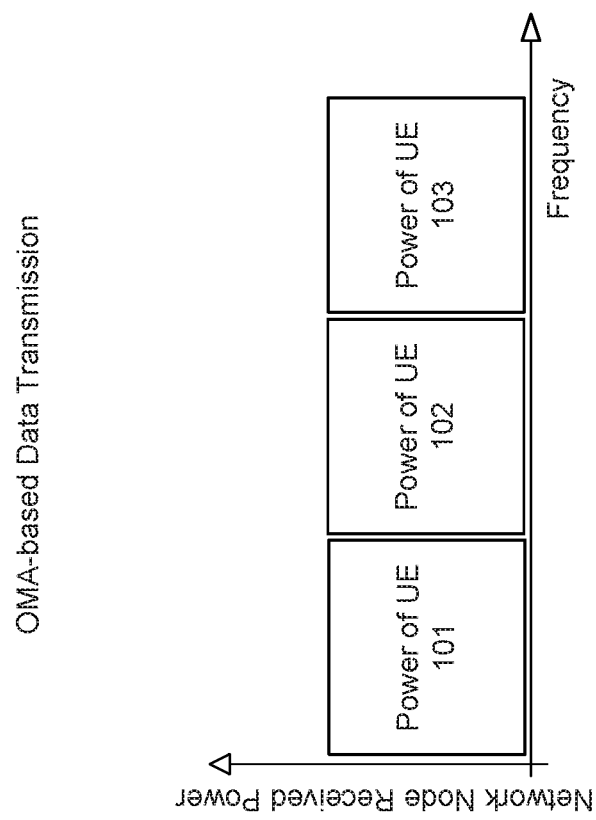
FIG. 5 illustrates processing performed by a network node according to one embodiment.

In some embodiments, the network nodes may determine an OMA-based transmission scheme, as shown in FIG. 5, as the appropriate multiple access scheme. In such embodiments, the maximum achievable rates for the UEs are given by:

$$\begin{cases} R_{101,OMA} = \frac{1}{3}\log 2(1 + 3P_{101}g_{101,105})\left[\frac{\text{bit}}{\text{symbol}}\right], & \text{(i)} \\ R_{102,OMA} = \max\left(\frac{1}{3}\log_2(1 + 3P_{102}g_{102,105}), & \text{(ii)} \right. \\ \qquad \frac{1}{3}\log_2(1 + 3P_{102}g_{102,107})\right)\left[\frac{\text{bit}}{\text{symbol}}\right], \\ R_{103,OMA} = \frac{1}{3}\log_2(1 + 3P_{103}g_{103,107})\left[\frac{\text{bit}}{\text{symbol}}\right]. & \text{(iii)} \end{cases} \quad (3)$$

Here, $R_{i,OMA}$ is the achievable rate of $UE_i$ using OMA and $g_{ij}=|h_{ij}|^2$ where $h_{ij}$ indicates the channel coefficient in the $UE_i$—network $node_j$ connection link where i=101, 102, and 103 and j=105, 107. The equation (3) is based on the fact that it is sufficient for only one of the network nodes to correctly decode the message of UE 102 when using CoMP. In some embodiments, the network nodes may first share each respective received signal and then decode the messages using, for example, maximum ratio combining based receivers. OMA-based data transmission is selected if $r_{102} \leq R_{102,OMA}$ because the rate requirement of UE 102 is supported without additional decoding complexity and/or delay caused by using NOMA.

If the minimum rate requirement of UE 102 is not satisfied with OMA, i.e. $r_{102} > R_{102,OMA}$, the network nodes utilize the information about the channel qualities to determine whether at least one of the network nodes can correctly decode the message of UE 102 using NOMA.

Figure 6A:
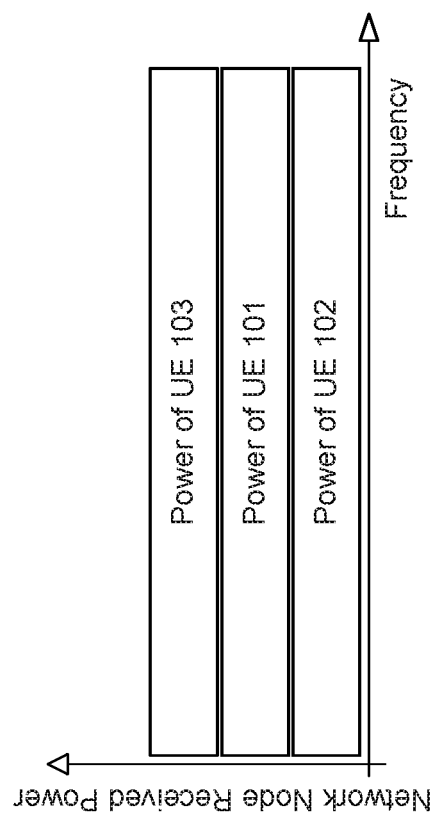
FIGS. 6A-6C illustrate processing performed by a network node according to some embodiments.

In a NOMA subplot (a), the UEs share an entire available spectrum using CoMP-NOMA, as shown in FIG. 6A, and the maximum achievable rates of the UEs are obtained as described in the following with reference to FIG. 4.

The maximum achievable rate of $UE_i$ using NOMA is denoted as $R_{i,NoMA}$. If UE 102 is at point B, the first network node 105 may use a SIC-based receiver to first decode-and-remove the message of UE 101 and then decode the message of UE 102 according to some embodiments. For the purposes of explanation, it is assumed that the link between the UE 103 and the first network node 105, i.e. $h_{103,105}$, is so weak that the corresponding interference added in the first network node 105, i.e. the term $P_{103}g_{103,105}$ in (4)(i) and (4)(ii), is negligible, and therefore the first network node 105 does not decode and remove the message of UE 103. This is not required, however, and the proposed setup may be applied to embodiments in which first network node 105 attempts to decode all received UE messages. Once the first network node 105 decodes the message of UE 102, the first network node 105 uses a backhaul link to transmit the decoded message of UE 101 and UE 102 to the second network node 107. The second network node 107 utilizes a remove-and-decode receiver to first remove the messages of UE 101 and UE 102 from a received signal using the received decoded messages of UE 101 and UE 102. The second network node 107 and then decodes the message of UE 103 free of interference. Accordingly, the maximum achievable rates of the UEs in this embodiment are given by $$\begin{cases} R_{101,NoMA} = \log_2\left(1 + \frac{P_{101}g_{101,105}}{1 + P_{102}g_{102,105} + P_{103}g_{103,105}}\right)\left[\frac{\text{bit}}{\text{symbol}}\right], & \text{(i)} \\ R_{102,NoMA} = \log_2\left(1 + \frac{P_{102}g_{102,105}}{1 + P_{103}g_{103,105}}\right)\left[\frac{\text{bit}}{\text{symbol}}\right], & \text{(ii)} \\ R_{103,NoMA} = \log_2(1 + P_{103}g_{103,107})\left[\frac{\text{bit}}{\text{symbol}}\right], & \text{(iii)} \end{cases} \quad (4)$$

In some embodiments the roles of the network nodes are reversed. For example, the second network node 107 uses the SIC-based receiver to first decode-and-remove the message of UE 103 and then decodes the message of UE 102. If each of the first and second network nodes 105, 107 use the remove-and-decode and the SIC-based receiver, respectively, the second network node 107 uses the backhaul link to transmit the decoded UE 102 message and UE 103 message to the first network node 105. In such embodiments, the maximum achievable rates are given by $$\begin{cases} R_{101,NoMA} = \log_2(1 + P_{101}g_{101,105})\left[\frac{\text{bit}}{\text{symbol}}\right], & \text{(i)} \\ R_{102,NoMA} = \log_2\left(1 + \frac{P_{102}g_{102,107}}{1 + P_{101}g_{101,107}}\right)\left[\frac{\text{bit}}{\text{symbol}}\right], & \text{(ii)} \\ R_{103,NoMA} = \log_2\left(\frac{P_{101}g_{101,107}}{1 + P_{101}g_{101,107} + P_{102}g_{102,107}}\right)\left[\frac{\text{bit}}{\text{symbol}}\right], & \text{(iii)} \end{cases} \quad (5)$$

By combining Equations (4) and (5), the maximum achievable rate for UE 102 in the CoMP-NOMA based data transmission approach with full spectrum sharing between the UEs according to subplot (a), is obtained by $$R_{102,NoMA}^{(a)} = \max\left(\log_2\left(1 + \frac{P_{102}g_{102,105}}{1 + P_{103}g_{103,105}}\right), \log_2\left(1 + \frac{P_{102}g_{102,107}}{1 + P_{101}g_{101,107}}\right)\right) \quad (6)$$

Figure 6B:
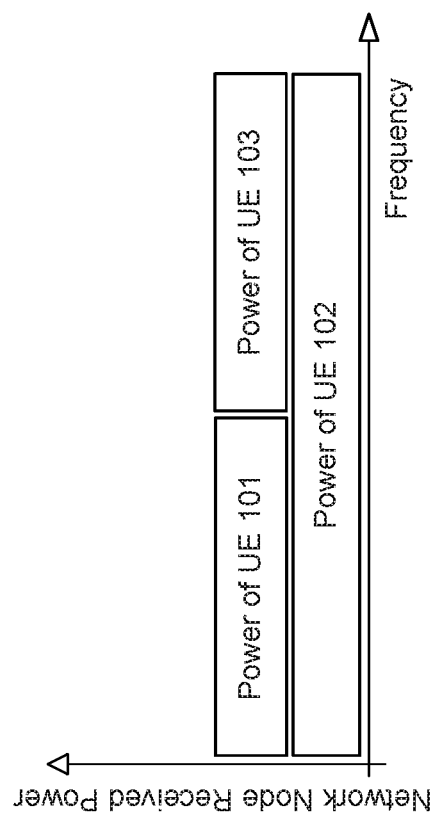

In a NOMA subplot (b), the cell-edge UE 102 uses the whole spectrum while the cell-center UEs, i.e., UE 101 and UE 103, only use half of the spectrum, as shown in FIG. 6B, and the maximum achievable rates of the UEs are obtained as described in the following with reference to FIG. 4.

In some embodiments, the first network node 105 may use a SIC-based receiver to decode the messages of UE 101 and UE 102. The first network node 105 transmits the decoded message of UE 102 to the second network node 107 using the backhaul link. The second network node 107 then uses the decoded message of UE 102 to decode the message of UE 103 using a remove-and-decode receiver without interference. The achievable rates in such embodiments are given by $$\begin{cases} R_{101,NoMA} = \frac{1}{2}\log_2\left(1 + \frac{2P_{101}g_{101,105}}{1+P_{102}g_{102,105}}\right)\left[\frac{\text{bit}}{\text{symbol}}\right], & \text{(i)} \\ R_{102,NoMA} = \frac{1}{2}\log_2(1 + P_{102}g_{102,105}) + & \text{(ii)} \\ \qquad \frac{1}{2}\log_2\left(1 + \frac{P_{102}g_{102,105}}{1+2P_{103}g_{103,105}}\right)\left[\frac{\text{bit}}{\text{symbol}}\right], \\ R_{103,NoMA} = \frac{1}{2}\log_2(1 + 2P_{103}g_{103,107})\left[\frac{\text{bit}}{\text{symbol}}\right], & \text{(iii)} \end{cases} \quad (7)$$

In some embodiments the roles of the network nodes are reversed. The second network node 107 may use a SIC-based receiver to decode the messages of UE 102 and UE 103. The second network node 107 transmits the decoded message of UE 102 to the first network node 105 using the backhaul link. The first network node 105 then uses the decoded message of UE 102 to decode the message of UE 101 using a remove-and-decode receiver without interference. The achievable rates in such embodiments are given by $$\begin{cases} R_{101,NoMA} = \frac{1}{2}\log_2(1 + 2P_{101}g_{101,105})\left[\frac{\text{bit}}{\text{symbol}}\right], & \text{(i)} \\ R_{102,NoMA} = \frac{1}{2}\log_2(1 + P_{102}g_{102,107}) + & \text{(ii)} \\ \qquad \frac{1}{2}\log_2\left(1 + \frac{P_{102}g_{102,107}}{1+2P_{101}g_{101,107}}\right)\left[\frac{\text{bit}}{\text{symbol}}\right], \\ R_{103,NoMA} = \frac{1}{2}\log_2\left(1 + \frac{2P_{103}g_{103,107}}{1+P_{102}g_{102,107}}\right)\left[\frac{\text{bit}}{\text{symbol}}\right], & \text{(iii)} \end{cases} \quad (8)$$

By combining Equations (7) and (8), the maximum achievable rate for UE 102 in the CoMP-NOMA based data transmission approach based on the spectrum allocation according to subplot (b), is obtained by $$R_{102,NoMA}^{(b)} = \max\begin{pmatrix} \frac{1}{2}\log_2(1 + P_{102}g_{102,105}) + \frac{1}{2}\log_2\left(1 + \frac{P_{102}g_{102,105}}{1+2P_{103}g_{103,105}}\right), \\ \frac{1}{2}\log_2(1 + P_{102}g_{102,107}) + \frac{1}{2}\log_2\left(1 + \frac{P_{102}g_{102,107}}{1+2P_{101}g_{101,107}}\right) \end{pmatrix}. \quad (9)$$

Figure 6C:
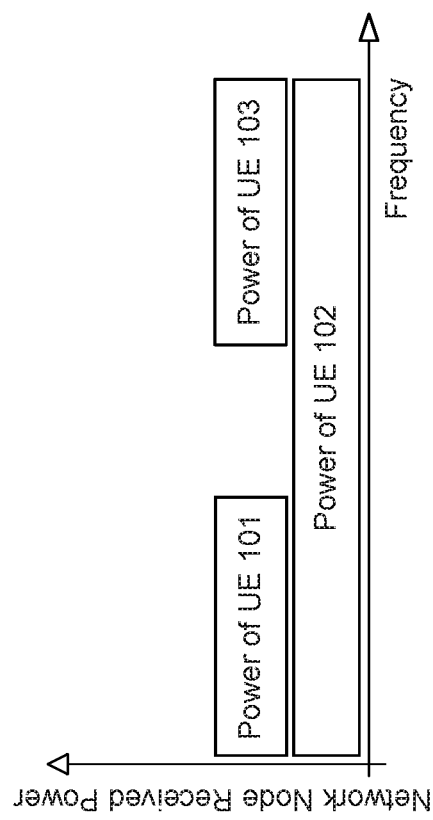

In a NOMA subplot (c), the cell-center UEs 101, 103 do not adapt each respective spectrum when switching from OMA-based transmission to NOMA based transmission while the cell-edge UE 102 uses the entire available spectrum, as shown in FIG. 6C.

In some embodiments, the first network node 105 may use a SIC-based receiver to decode the messages of UE 101 and UE 102. The first network node 105 transmits the decoded message of UE 102 to the second network node 107 using the backhaul link. The second network node 107 then uses the decoded message of UE 102 to decode the message of UE 103 using a remove-and-decode receiver without interference. The achievable rates in such embodiments are given by $$\begin{cases} R_{101,NoMA} = \frac{1}{3}\log_2\left(1 + \frac{3P_{101}g_{101,105}}{1+P_{102}g_{102,105}}\right)\left[\frac{\text{bit}}{\text{symbol}}\right], & \text{(i)} \\ R_{102,NoMA} = \frac{2}{3}\log_2(1 + P_{102}g_{102,105}) + & \text{(ii)} \\ \qquad \frac{1}{3}\log_2\left(1 + \frac{P_{102}g_{102,105}}{1+3P_{103}g_{103,105}}\right)\left[\frac{\text{bit}}{\text{symbol}}\right], \\ R_{103,NoMA} = \frac{1}{3}\log_2(1 + 3P_{103}g_{103,107})\left[\frac{\text{bit}}{\text{symbol}}\right], & \text{(iii)} \end{cases} \quad (10)$$

In some embodiments the roles of the network nodes are reversed. The second network node 107 may use a SIC-based receiver to decode the messages of UE 102 and UE 103. The second network node 107 transmits the decoded message of UE 102 to the first network node 105 using the backhaul link. The first network node 105 then uses the decoded message of UE 102 to decode the message of UE 101 using a remove-and-decode receiver without interference. The achievable rates in such embodiments are given by $$\begin{cases} R_{101,NoMA} = \frac{1}{3}\log_2(1 + 3P_{101}g_{101,105})\left[\frac{\text{bit}}{\text{symbol}}\right], & \text{(i)} \\ R_{102,NoMA} = \frac{2}{3}\log_2(1 + P_{102}g_{102,107}) + & \text{(ii)} \\ \qquad \frac{1}{3}\log_2\left(1 + \frac{P_{102}g_{102,107}}{1+2P_{101}g_{101,107}}\right)\left[\frac{\text{bit}}{\text{symbol}}\right], \\ R_{103,NoMA} = \frac{1}{3}\log_2\left(1 + \frac{3P_{101}g_{103,107}}{1+P_{102}g_{102,107}}\right)\left[\frac{\text{bit}}{\text{symbol}}\right], & \text{(iii)} \end{cases} \quad (11)$$

By combining Equations (10) and (11), the maximum achievable rate for UE 102 in the CoMP-NOMA based data transmission approach based on the spectrum allocation according to subplot (c), is obtained by $$R_{102,NoMA}^{(c)} = \max\begin{pmatrix} \frac{2}{3}\log_2(1 + P_{102}g_{102,105}) + \frac{1}{3}\log_2\left(1 + \frac{P_{102}g_{102,105}}{1+3P_{103}g_{103,105}}\right), \\ \frac{2}{3}\log_2(1 + P_{102}g_{102,107}) + \frac{1}{3}\log_2\left(1 + \frac{P_{102}g_{102,107}}{1+2P_{101}g_{101,107}}\right) \end{pmatrix}. \quad (12)$$

It can be easily shown that $R_{102,NoMA}^{(a)} \leq R_{102,NoMA}^{(b)} \leq R_{102,NoMA}^{(c)}$ and, depending on the added interference term from the other UEs, NoMA-based schemes may improve the achievable rate of UE 102 compared to the OMA-based approach.

The appropriate multiple access scheme is selected using Equations (3), (6), (9), and (12) and the rate demand of UE 102.

Step 3: The network nodes 105, 107 adapt each respective decoding scheme and backhauling method based on the selected multiple access scheme. The network nodes 105, 107 also inform the UEs about the selected multiple access scheme, the available spectrum, and the maximum achievable rate for each UE.

Step 4: The UEs adapt each respective transmission parameters, e.g., data rate, according to the selected multiple access scheme and available spectrum.

Step 5: If none of the multiple access schemes described above can support the rate requirement of UE 102, the message of UE 102 is scheduled to be transmitted in another time slot.

In some embodiments, the proposed CoMP-NOMA approach described herein makes it possible to increase the achievable rate of the cell-edge UEs and also improves the achievable rate of at least one of the cell-center UEs. Further, compared to non-CoMP NOMA based transmission, the CoMP-NOMA approach increases the probability of the usefulness/success of NOMA. This is because the proposed setup described herein switches to the NOMA-based approach once it is determined that at least one of the network nodes can successfully decode the messages by the SIC-based receiver and that OMA cannot support the required rate demand.

Compared to the cases with non-CoMP NOMA based transmission, the proposed setup described herein reduces the probability of requiring multiple retransmissions when using hybrid automatic repeat request (HARQ). The reasons for the reduced probability of required multiple retransmissions include, but are not limited to, (1) increased network diversity due to CoMP-based transmission, which considerably improves the performance of HARQ methods, and (2) the receipt of two copies of the UE messages by the network nodes in each time slot. The proposed CoMP NOMA approach decreases end-to-end packet transmission delay and, as a result, increases end-to-end throughput.

The embodiments disclosed herein are described with reference to two network nodes. This is not required, however, and the proposed setup may be extended to an arbitrary number of network nodes in alternative embodiments. Importantly, the relative performance gain of the proposed setup, compared to non-CoMP NOMA or CoMP-based OMA schemes, increases with the number of network nodes. The reasons for this include, but are not limited to, (1) the achievable rates of the cell-edge UEs and the probability that NOMA-based transmission improves the system performance increases with the number of network nodes, (2) with any different numbers of network nodes, only one network node needs to use the SIC-based receiver while the other network nodes may use remove-and-decode receiver, and (3) the network diversity increases with the number of network nodes.

The proposed setup reduces the decoding complexity/delay of the network nodes. This is because only one of the network nodes need to use the SIC-based receiver, while the other network nodes may decode each respective message(s) of interest via remove-and-decode receiver where the interfering messages are removed without decoding.

The embodiments disclosed herein are described with reference to the selection of the appropriate data transmission and decoding and backhauling schemes being based on the rate requirement of the cell-edge UE. This improves the system fairness. This is not required, however, and the proposed setup disclosed herein may be applied to other performance metrics, e.g., the rate requirement of all UEs, among others.

In some embodiments, the relative performance gain of NOMA, compared to OMA, increases when two UEs with very different signal strengths are grouped. CoMP-NOMA increases the relative performance gain of NOMA and simplifies the UE grouping procedure compared to the cases with a single network node because the presence of multiple network nodes increases the chance of finding UEs with different channel qualities. This is particularly interesting in dense networks with a large number of UEs which is a main use-case of interest in NOMA-based setups.

Figure 7:
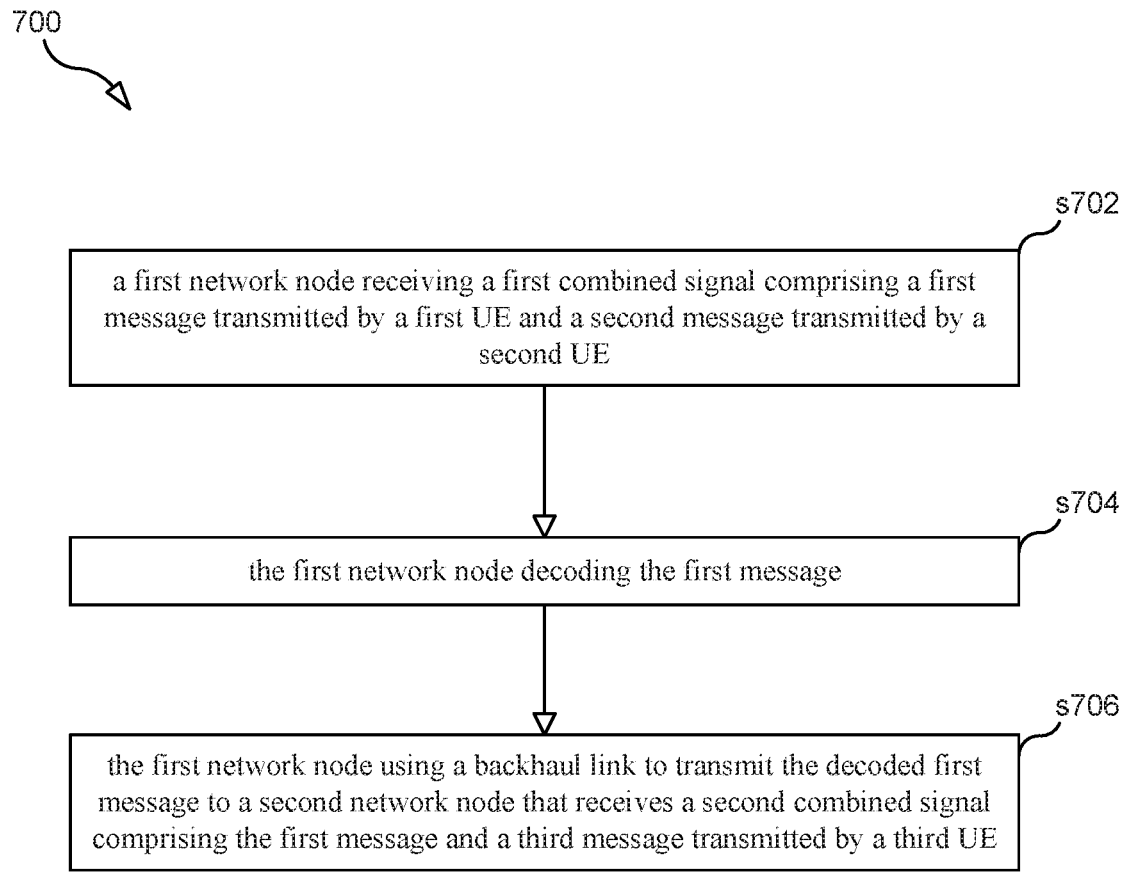
FIG. 7 is a flow chart illustrating a process according to one embodiment.

FIG. 7 is a flow chart illustrating a process 700, according to some embodiments, that is performed in a communication network. Process 700 may begin with step s702 in which a first network node (e.g., first network node 105) receives a first combined signal comprising a first message transmitted by a first UE and a second message transmitted by a second UE. In step s704, the first network node decodes the first message. In step s706, the first network node uses a backhaul link to transmit the decoded first message to a second network node (e.g., second network node 107) that receives a second combined signal comprising the first message and a third message transmitted by a third UE.

In some embodiments, the first network node uses a successive interference cancellation (SIC) based receiver to decode the first message.

In some embodiments, the process 700 includes a further step in which the first network node obtains first channel gain information indicating the gain of a first channel between the first network node and the first UE. In some embodiments, the process 700 includes a further step in which the first network node obtains second channel gain information indicating the gain of a second channel between the first network node and the second UE. In some embodiments, the process 700 includes a further step in which the first network node obtains a first rate demand for the first UE.

In some embodiments, the process 700 includes a further step in which the first network node determines a maximum achievable rate for the first UE based on at least the first channel gain information and the second channel gain information. In some embodiments, the process 700 includes a further step in which the first network node determines whether the first rate demand for the first UE is greater than the determined maximum achievable rate for the first UE.

In some embodiments, the process 700 includes a further step in which the first network node determines a non-orthogonal multiple access (NOMA) scheme based on the determination of whether the first rate demand for the first UE is greater than the determined maximum achievable rate for the first UE.

In some embodiments, the process 700 includes a further step in which the second network node uses the first message received from the first network node to decode the third message from the second combined signal. In some embodiments, using the first message received from the first network node to decode the third message from the second combined signal comprises the second network node removing the first message from the second combined signal. After removing the first message from the second combined signal, thereby obtaining a modified second combined signal, the second network node decodes the third message from the modified second combined signal.

In some embodiments, the process 700 includes a further step in which the first network node uses the decoded first message to decode the second message from the first combined signal and the first network node uses the backhaul link to transmit the decoded second message to the second network node.

In some embodiments, the first network node using the decoded first message to decode the second message comprises the first network node removing the first message from the first combined signal. After removing the first message from the first combined signal, thereby obtaining a modified first combined signal, the first network node decodes the second message from the modified first combined signal.

In some embodiments, second combined signal further comprises the second message. In such embodiments, the process 700 includes a further step in which the second network node uses the first and second messages received from the first network node to decode the third message from the second combined signal. In some embodiments, the second network using the first and second messages received from the first network node decode the third message from the second combined signal comprises the second network node removing the first and second messages from the second combined signal. After removing the first and second messages from the second combined signal, thereby obtaining a modified second combined signal, the second network node decodes the third message from the modified second combined signal.

Figure 8:
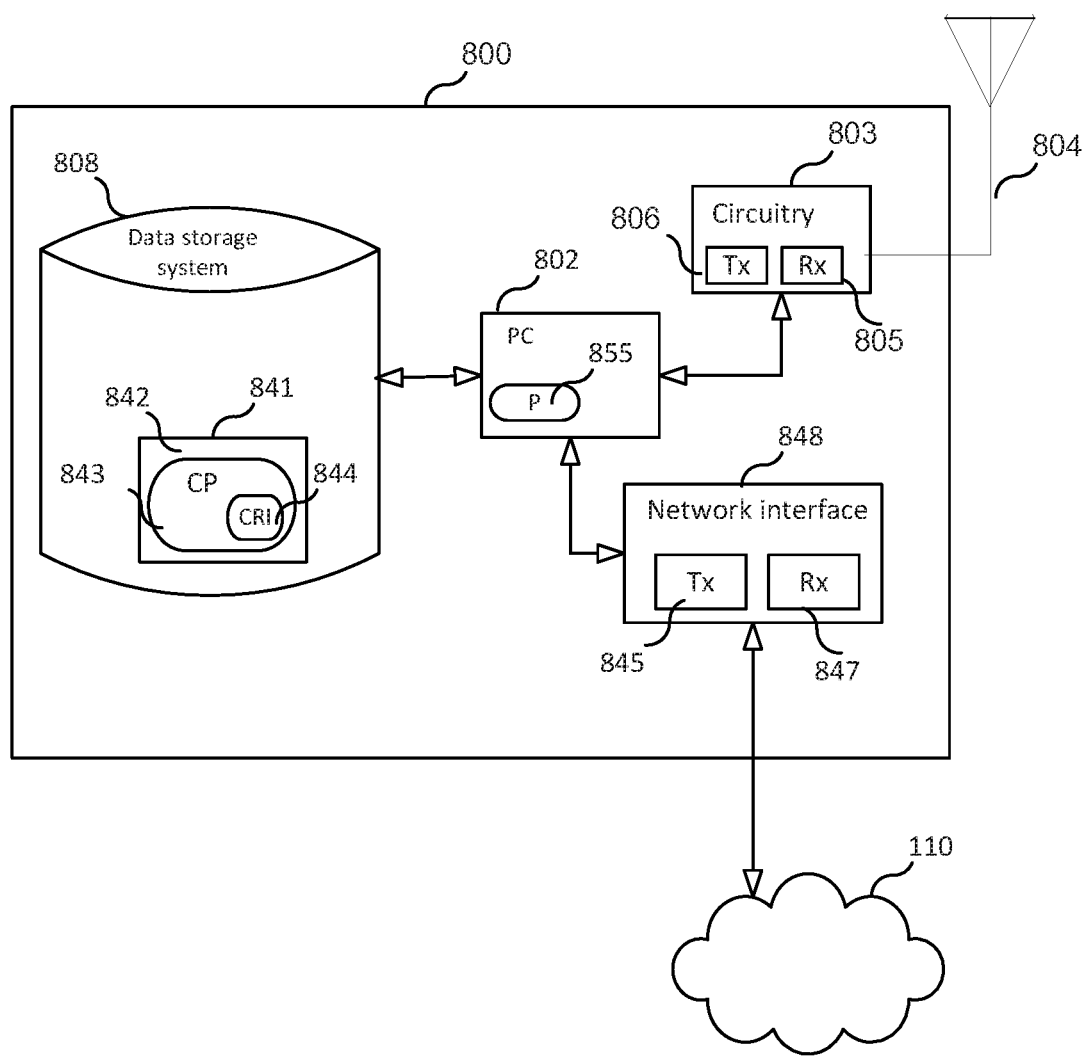
FIG. 8 is a block diagram of a network node according to one embodiment.

FIG. 8 is a block diagram of network node 800 according to some embodiments. As shown in FIG. 8, network node 800 may comprise: a processing circuit (PC) 802, which may include one or more processors (P) 855 (e.g., a general purpose microprocessor and/or one or more other processors, such as an application specific integrated circuit (ASIC), field-programmable gate arrays (FPGAs), and the like) which processors may be co-located or distributed across different locations; a network interface 848 comprising a transmitter (Tx) 845 and a receiver (Rx) 847 for enabling network node 800 to transmit data to and receive data from other nodes connected to a network 110 (e.g., an Internet Protocol (IP) network) to which network interface 848 is connected; circuitry 803 (e.g., radio transceiver circuitry comprising an Rx 805 and a Tx 806) coupled to an antenna system 804 for wireless communication with UEs); and local storage unit (a.k.a., "data storage system") 808, which may include one or more non-volatile storage devices and/or one or more volatile storage devices (e.g., random access memory (RAM)). In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory, flash memory), and the like. In some embodiments, the CRI 844 of computer program 843 is configured such that when executed by data processing apparatus 802, the CRI causes network node 800 to perform steps described herein (e.g., steps described herein with reference to the flow charts and/or message flow diagrams). In other embodiments, network node 800 may be configured to perform steps described herein without the need for code. That is, for example, PC 802 may consist merely of one or more ASICs. Hence, the features of the embodiments described herein may be implemented in hardware and/or software.

Figure 9:
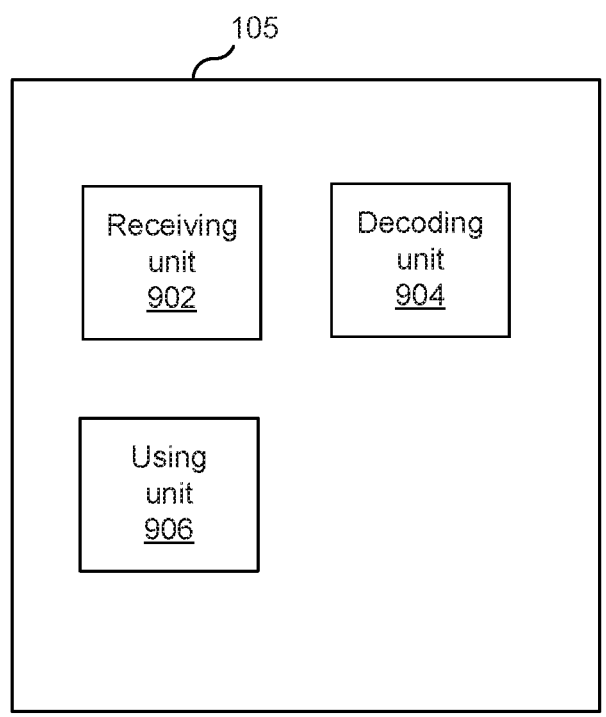
FIG. 9 is a diagram showing functional units of a network node according to one embodiment.

FIG. 9 is a diagram showing functional units of network node 105 according to some embodiments. As shown in FIG. 9, network node 105 includes a receiving unit 902 for receiving a first combined signal comprising a first message transmitted by a first user equipment, UE, and a second message transmitted by a second UE; a decoding unit 904 for decoding the first message; and a using unit 906 for using a backhaul link to transmit the decoded first message to a second network node that receives a second combined signal comprising the first message and a third message transmitted by a third UE.

Figure 10:
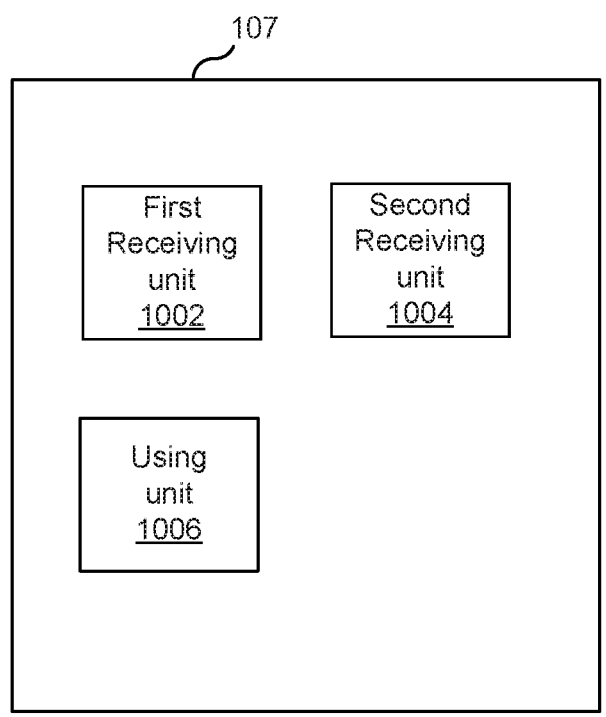
FIG. 10 is a diagram showing functional units of a network node according to one embodiment.

FIG. 10 is a diagram showing functional units of network node 107 according to some embodiments. As shown in FIG. 10, network node 107 includes a first receiving unit 1002 for receiving a first combined signal comprising a first message transmitted by a first user equipment, UE, and a second message transmitted by a second UE; a second receiving unit 1004 for receiving, using a backhaul link, a decoded first message transmitted by a second network node that receives a second combined signal comprising the first message and a third message transmitted by a third UE; and a using unit 1006 for using the decoded first message transmitted by the second network node to decode the second message from the first combined signal.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in a communication network, the method comprising:

a first network node receiving a first combined signal comprising a first message transmitted by a first user equipment (UE) and a second message transmitted by a second UE;

the first network node decoding the first message;

the first network node using a backhaul link to transmit the decoded first message to a second network node;

the second network node receiving a second combined signal comprising the first message and a third message transmitted by a third UE that is different than the second UE;

the second network node receiving the decoded first message transmitted by the first network node; and the second network node using the decoded first message transmitted by the first network node to decode the third message from the second combined signal, wherein the first UE has a buffer size, and the method further comprises the first network node choosing between a non-orthogonal multiple access (NOMA) scheme and an orthogonal multiple access (OMA) scheme based on at least a data rate associated with the first UE's buffer size.

2. The method of claim 1, wherein the method further comprises:

the first network node obtaining first channel gain information indicating the gain of a first channel between the first network node and the first UE;

the first network node obtaining second channel gain information indicating the gain of a second channel between the second network node and the second UE;

the first network node obtaining the first UE's buffer size; and determining a data rate associated with the first UE's buffer size, wherein the NOMA scheme and the OMA scheme based on at least the data rate associated with the first UE's buffer size comprises choosing between the NOMA and OMA schemes using the first channel gain information, the second channel gain information, and the data rate associated with the first UE's buffer size.

3. The method of claim 2, wherein choosing between the NOMA and OMA schemes using the gain of the first channel, the gain of the second channel, and the data rate associated with the first UE's buffer size comprises:
 determining a maximum achievable rate for the first UE based on at least the first channel gain information and the second channel gain information; and
 determining whether the data rate associated with the first UE's buffer size is greater than the determined maximum achievable rate for the first UE.

4. The method of claim 1, further comprising:
 the second network node using the first message received from the first network node to decode the third message from the second combined signal.

5. The method of claim 4, wherein using the first message received from the first network node to decode the third message from the second combined signal comprises:
 the second network node removing the first message from the second combined signal; and
 after removing the first message from the second combined signal, thereby obtaining a modified second combined signal, the second network node decoding the third message from the second combined signal.

6. The method of claim 1, further comprising:
 the first network node using the decoded first message to decode the second message from the first combined signal; and
 the first network node using the backhaul link to transmit the decoded second message to the second network node.

7. The method of claim 6, wherein the first network node using the decoded first message to decode the second message comprises:
 the first network node removing the first message from the first combined signal; and
 after removing the first message from the first combined signal, thereby obtaining a modified first combined signal, the first network node decoding the second message from the modified first combined signal.

8. The method of claim 6, wherein the second combined signal further comprises the second message, the method further comprising:
 the second network node using the first and second messages received from the first network node to decode the third message from the second combined signal.

9. The method of claim 8, wherein the second network using the first and second messages received from the first network node to decode the third message from the second combined signal comprises:
 the second network node removing the first and second messages from the second combined signal; and
 after removing the first and second messages from the second combined signal, thereby obtaining a modified second combined signal, the second network node decoding the third message from the modified second combined signal.

10. A network comprising:
 a first network node;
 a second network node; and
 a backhaul link between the first network node and the second network node, wherein the first network node is adapted to:
 receive a first combined signal comprising a first message transmitted by a first user equipment (UE) and a second message transmitted by a second UE;
 decode the first message; and
 use the backhaul link to transmit the decoded first message to the second network node, and
the second network node is adapted to:
 receive the decoded first message transmitted by the first network node;
 received a second combined signal comprising the first message and a third message transmitted by a third UE that is different than the second UE; and
 use the decoded first message transmitted by the first network node to decode the third message from the second combined signal, wherein
the first UE has a buffer size, and
the first network node is further adapted to choose between a non-orthogonal multiple access (NOMA) scheme and an orthogonal multiple access (OMA) scheme based on at least a data rate associated with the first UE's buffer size.

11. The first network node of claim 10, further adapted to use a successive interference cancellation (SIC) based receiver to decode the first message.

12. The first network node of claim 10, wherein
the first network node is further configured to:
 obtain first channel gain information indicating the gain of a first channel between the first network node and the first UE;
 obtain second channel gain information indicating the gain of a second channel between the second network node and the second UE;
 obtain the first UE's buffer size; and
 determine a data rate associated with the first UE's buffer size, wherein
the first network node is configured to choose between the NOMA and OMA schemes based on at least the data rate associated with the first UE's buffer size by choosing between the NOMA and OMA schemes using the first channel gain information, the second channel gain information, and the data rate associated with the first UE's buffer size.

13. The first network node of claim 12, wherein choosing between the NOMA and OMA schemes using the gain of the first channel, the gain of the second channel, and the data rate associated with the first UE's buffer size comprises:
 determining a maximum achievable rate for the first UE based on at least the first channel gain information and the second channel gain information; and
 determining whether the data rate associated with the first UE's buffer size is greater than the determined maximum achievable rate for the first UE.

14. The first network node of claim 10, further adapted to:
 use the decoded first message to decode the second message from the first combined signal; and
 use the backhaul link to transmit the decoded second message to the second network node.

15. The first network node of claim 14, wherein the first network node using the decoded first message to decode the second message comprises:
 the first network node removing the first message from the first combined signal; and
 after removing the first message from the first combined signal, thereby obtaining a modified first combined signal, the first network node decoding the second message from the modified first combined signal.

16. A first network node adapted to:
receive a first combined signal comprising a first message transmitted by a first user equipment (UE) and a second message transmitted by a second UE;
receive, using a backhaul link, a decoded first message transmitted by a second network node that receives a second combined signal comprising the first message and a third message transmitted by a third UE that is different than the second UE; and
use the decoded first message transmitted by the second network node to decode the second message from the first combined signal, wherein
the first UE has a buffer size, and
the first network node is further adapted to choose between a non-orthogonal multiple access (NOMA) scheme and an orthogonal multiple access (OMA) scheme based on at least a data rate associated with the first UE's buffer size.

17. The first network of claim 16, wherein using the decoded first message transmitted by the second network node to decode the second message from the first combined signal comprises:

the first network node removing the first message from the first combined signal; and
after removing the first message from the first combined signal, thereby obtaining a modified first combined signal, the first network node decoding the second message from the modified first combined signal.

18. The first network node of claim 16, wherein
the first combined signal further comprises a third message transmitted by a third UE,
the first network node is further adapted to receive, using the backhaul link, a decoded third message transmitted by the second network node; and
the first network node is further adapted to use the decoded first message and the decoded third message transmitted by the second network node to decode the second message from the first combined signal.

19. A computer program product comprising a non-transitory computer readable medium storing a computer program comprising instructions which, when executed by processing circuitry, causes the processing circuitry to carry out the method of claim 1.

* * * * *